(12) United States Patent
Laudon

(10) Patent No.: US 6,554,294 B2
(45) Date of Patent: Apr. 29, 2003

(54) SKI BICYCLE AND SKI SYSTEM FOR A BICYCLE

(76) Inventor: Hans Laudon, 4024 E. Western Star Blvd., Phoenix, AZ (US) 85044

( * ) Notice: Subject to any disclaimer, the term of this patent is extended or adjusted under 35 U.S.C. 154(b) by 0 days.

(21) Appl. No.: 09/841,428

(22) Filed: Apr. 24, 2001

(65) Prior Publication Data

US 2002/0153677 A1 Oct. 24, 2002

(51) Int. Cl.⁷ .......................................... B62M 27/02
(52) U.S. Cl. ...................... 280/7.14; 280/12.14; 280/16
(58) Field of Search ................ 280/7.14, 7.12, 280/7.13, 12.1, 12.12, 12.14, 28.5, 16, 18, 8, 9, 10, 288.4, 296; 180/186, 185, 196, 227, 184, 9.25

(56) References Cited

U.S. PATENT DOCUMENTS

| | | | | |
|---|---|---|---|---|
| 473,434 A | | 4/1892 | Stevens ................... | 280/7.14 |
| 526,210 A | | 9/1894 | Young ..................... | 280/7.14 |
| 560,350 A | * | 3/1896 | Hokanson et al. ......... | 280/7.14 |
| 561,405 A | | 6/1896 | Leahan .................... | 280/7.14 |
| 566,438 A | | 8/1896 | Anderson et al. .......... | 280/7.14 |
| 567,526 A | | 9/1896 | Ward ....................... | 280/7.14 |
| 573,034 A | | 12/1896 | Peterson .................. | 280/7.14 |
| 590,351 A | | 9/1897 | Wuggenig ................ | 280/7.14 |
| 613,773 A | * | 11/1898 | Neumann ................. | 280/7.12 |
| 613,940 A | * | 11/1898 | Ringborg .................. | 280/7.12 |
| 633,030 A | | 9/1899 | Nelson .................... | 280/7.14 |
| 638,575 A | | 12/1899 | Guay ...................... | 280/7.14 |
| 650,171 A | | 5/1900 | Dannehl .................. | 280/7.14 |
| 755,170 A | * | 3/1904 | Reed ...................... | 280/7.14 |
| 764,442 A | | 7/1904 | Erickson et al. .......... | 280/7.14 |
| 773,959 A | | 11/1904 | Meissner .................. | 280/7.14 |
| 800,186 A | | 9/1905 | Vaughan .................. | 280/7.14 |
| 850,125 A | * | 4/1907 | Baldauf ................... | 280/7.14 |
| 1,146,210 A | | 7/1915 | Steen ...................... | 280/7.14 |
| 1,268,229 A | * | 6/1918 | Frank ...................... | 280/7.14 |
| 1,281,980 A | * | 10/1918 | Kostewich ................ | 280/7.14 |
| 1,291,115 A | * | 1/1919 | Pilushczak ................ | 280/7.14 |
| 1,337,396 A | * | 4/1920 | Eiselt ...................... | 280/7.14 |
| 1,453,722 A | * | 5/1923 | Nuoffer ................... | 280/9 |
| 1,654,284 A | | 12/1927 | Fageol .................... | 280/7.14 |
| 1,672,782 A | | 6/1928 | Ring ....................... | 280/7.14 |
| 1,714,902 A | * | 5/1929 | Croswell .................. | 280/9 |
| 1,809,295 A | | 6/1931 | Gundersen ............... | 280/7.14 |
| 2,085,295 A | | 6/1937 | Campbell ................. | 280/7.14 |
| 2,316,272 A | | 4/1943 | Meyer .................... | 280/7.14 |
| 2,479,674 A | | 8/1949 | Elliot ...................... | 280/7.14 |
| 3,077,238 A | | 2/1963 | Nelson .................... | 280/7.14 |
| 3,140,099 A | | 7/1964 | Feu ........................ | 280/7.14 |
| 3,145,030 A | | 8/1964 | Millis ...................... | 280/7.14 |
| 3,178,195 A | | 4/1965 | Colace .................... | 280/7.14 |
| 3,203,706 A | | 8/1965 | Boyden ................... | 280/7.14 |
| 3,297,335 A | | 1/1967 | Ogata ..................... | 280/7.14 |
| 3,441,285 A | * | 4/1969 | Rogers .................... | 280/7.12 |
| 3,561,777 A | * | 2/1971 | Geis ....................... | 280/7.12 |
| 3,561,783 A | | 2/1971 | Ellet ....................... | 280/7.14 |
| 3,630,301 A | | 12/1971 | Henricks .................. | 280/7.14 |
| 3,682,495 A | | 8/1972 | Zaimi ..................... | 280/7.14 |
| 3,814,198 A | | 6/1974 | Seiler ...................... | 280/7.14 |
| 3,884,484 A | | 5/1975 | Uhlyarik .................. | 280/7.14 |

(List continued on next page.)

Primary Examiner—Brian L. Johnson
Assistant Examiner—J. Allen Shriver
(74) Attorney, Agent, or Firm—Parsons & Goltry; Robert A. Parsons; Michael W. Goltry

(57) ABSTRACT

A bicycle including a frame having front forks and an attached rear wheel, a front wheel, a ski, an attachment assembly disposed on the ski and another attachment assembly disposed on the frame, wherein the frame is adjustable between a wheeled condition including the front wheel attached to the front forks and the ski attached to the other attachment assembly and a skied condition including the attachment assembly attached to the front forks and the rear wheel.

14 Claims, 6 Drawing Sheets

U.S. PATENT DOCUMENTS

| | | | | |
|---|---|---|---|---|
| 4,027,891 A | * | 6/1977 | Frame | 280/16 |
| 4,059,168 A | * | 11/1977 | House | 180/183 |
| 4,131,292 A | | 12/1978 | Swech | 280/7.14 |
| 4,168,841 A | | 9/1979 | Uhlyarik | 280/7.14 |
| 4,466,626 A | * | 8/1984 | Leritz | 280/12.14 |
| 4,479,657 A | * | 10/1984 | Reynolds | 280/8 |
| 4,828,280 A | * | 5/1989 | Kies | 280/12.14 |
| 5,102,153 A | * | 4/1992 | Rhode | 180/185 |
| 5,407,217 A | * | 4/1995 | Lambert et al. | 280/10 |
| 5,588,661 A | * | 12/1996 | Wolfe | 280/202 |
| 5,738,361 A | | 4/1998 | Landucci | 280/7.14 |
| 6,416,062 B1 | * | 7/2002 | Scatchard | 280/12.14 |

* cited by examiner

SKI BICYCLE AND SKI SYSTEM FOR A BICYCLE

FIELD OF THE INVENTION

This invention relates to recreational equipment and, more particularly, to ski equipment and bicycles.

BACKGROUND OF THE INVENTION

Skiing and cycling are enormously popular sports. As a result, the technology in connection with ski equipment and road and mountain bikes has improved dramatically throughout the last decade. Mountain biking is an especially popular form of recreation and exercise, and many people find enormous pleasure riding their mountain bikes on snowy backcountry trails or in alpine/mountainous regions with partial snow conditions. However, many outdoor enthusiasts find it especially difficult and even dangerous to attempt to ride their bikes down snowy hills, especially when the hill is steep or the snow is deep. Additionally, seated ski devices are gaining some popularity. These devices can be very difficult to transport to the top of a slope. In view of this, it would be highly advantageous to provide adventurous people with the ability to easily and effortlessly combine the benefits of cycling, and especially mountain biking, with the enjoyment of skiing. Thus, there is a need for a bicycle and a ski system for converting the bicycle between wheeled and skied conditions very quickly for providing a rider with the ability to switch between wheeled navigation and ski navigation.

SUMMARY OF THE INVENTION

The above problems and others are at least partially solved and the above purposes and others realized in new and improved bicycle and ski system for a bicycle. In a preferred embodiment, the invention proposes apparatus including a bicycle frame having front forks and an attached rear wheel, a ski and an attachment assembly securing the front forks and the rear wheel to the ski. The attachment assembly includes an attachment hub securing the front forks to the ski and a harness securing the rear wheel to the ski. The attachment hub includes a quick release assembly carried by a support attached to the ski, and the support includes a first portion supporting the quick release assembly and a resiliently attached second portion attached to the ski. The harness includes closable straps attached to a base secured to the ski. A front wheel that is removably engagable to the front forks is also included. In this embodiment, the front wheel is attached to the rear wheel and to portions of the frame with attachments.

In another embodiment, the invention proposes apparatus including a bicycle frame having front forks and an attached rear wheel, a front wheel, a ski and an attachment assembly disposed on the ski. The frame is adjustable between a wheeled condition including the front wheel attached to the front forks and a skied condition including the attachment assembly attached to the front forks and the rear wheel. The attachment assembly includes an attachment hub and a harness. The attachment hub includes a quick release assembly carried by a support attached to the ski, and the support includes a first portion supporting the quick release assembly and a resiliently attached second portion attached to the ski. The harness includes closable straps attached to a base secured to the ski. Also included are attachments for releasably securing the front wheel to the rear wheel and to portions of the frame in the skied condition of the frame.

In yet another embodiment, the invention proposes apparatus including a bicycle frame having front forks and an attached rear wheel, a front wheel, a ski, an attachment assembly disposed on the ski and another attachment assembly disposed on the frame. In this embodiment, the frame is adjustable between a wheeled condition including the front wheel attached to the front forks and the ski attached to the other attachment assembly and a skied condition including the attachment assembly attached to the front forks and the rear wheel. The attachment assembly includes an attachment hub and a harness. The attachment hub includes a quick release assembly carried by a support attached to the ski, and the support includes an upper portion supporting the quick release assembly and a resiliently attached lower portion attached to the ski. The harness includes closable straps attached to a base secured to the ski. The other attachment assembly includes a strapped gripping element and a closable strap. Also included are attachments for releasably securing the front wheel to the rear wheel and to portions of the frame in the skied condition of the frame.

Consistent with the foregoing, the invention also contemplates associated methods.

BRIEF DESCRIPTION OF THE DRAWINGS

Referring to the drawings.

DETAILED DESCRIPTION OF A PREFERRED EMBODIMENT

Figure 1:
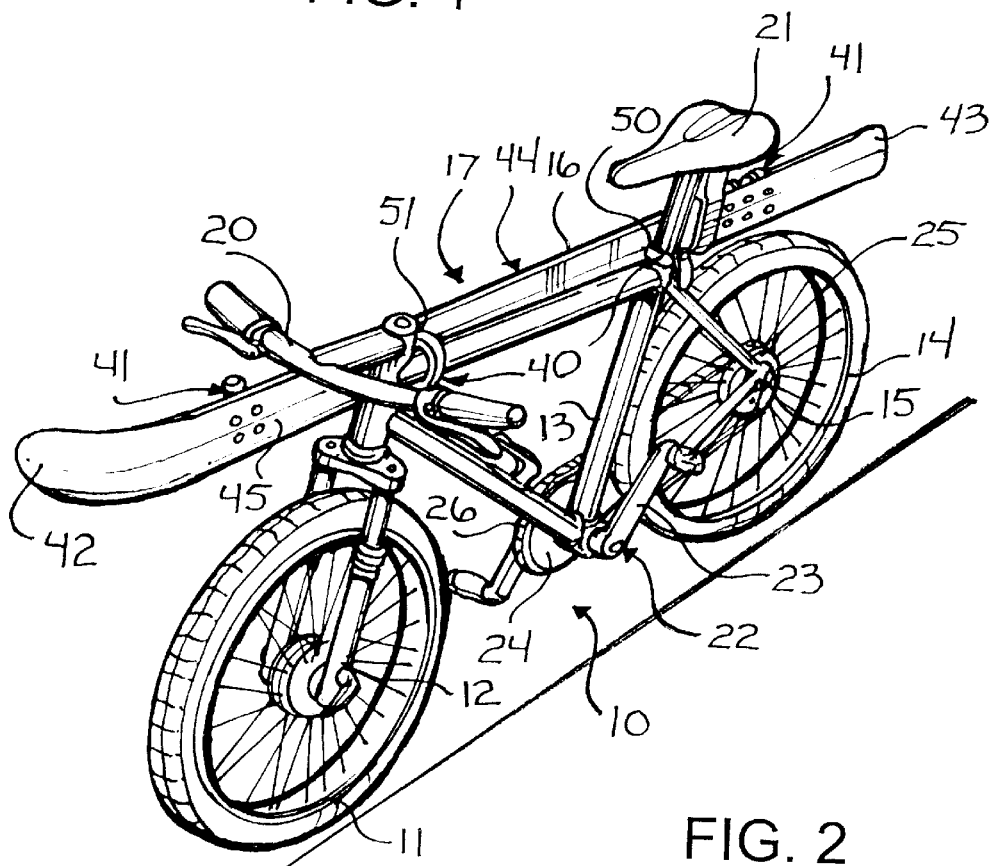
FIG. 1 is a perspective view of a bicycle including front and rear wheels attached to a frame and a ski supported by an attachment assembly disposed on the frame, in accordance with the invention.
Figure 2:
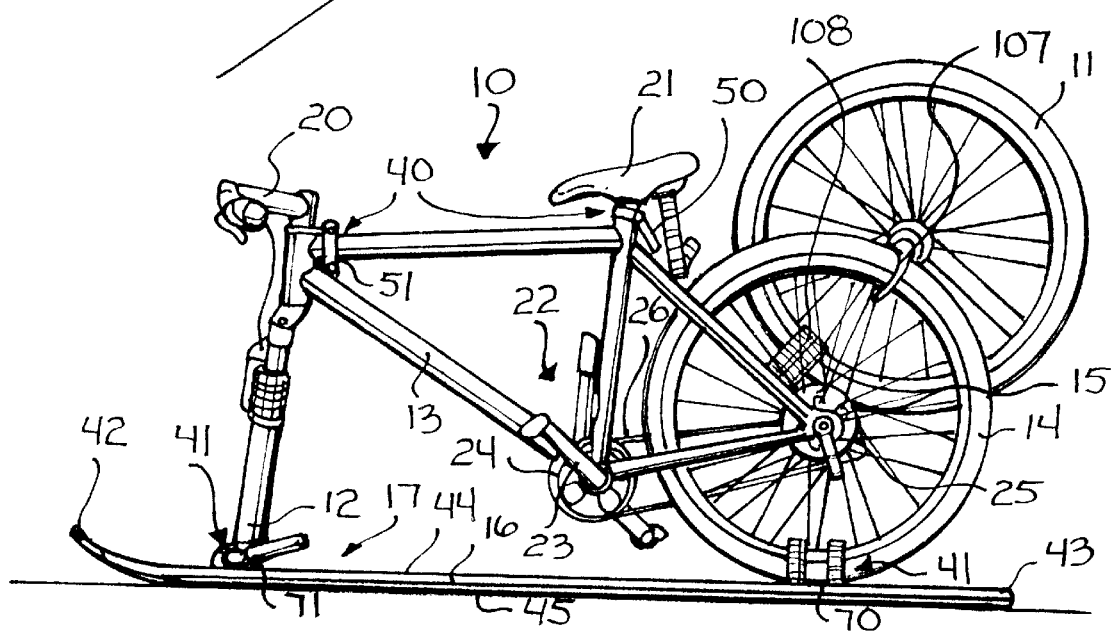
FIG. 2 is a side elevation view of the bicycle of FIG. 1 with the ski attached to front forks of the frame and the rear wheel, and the front wheel attached to portions of the frame and the rear wheel.
Figure 4:
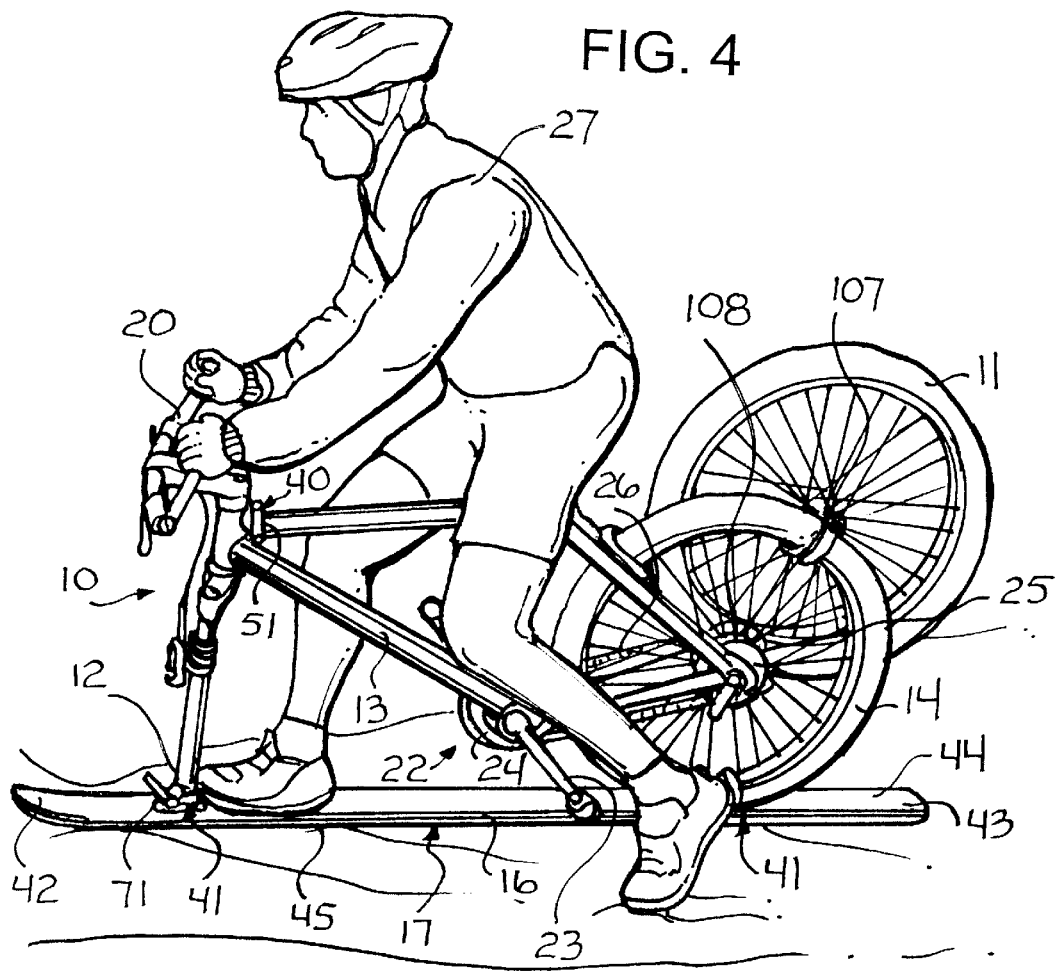
FIG. 4 is a side elevation view of the bicycle of FIG. 2 as it would appear being ridden by a rider.
Figure 3:
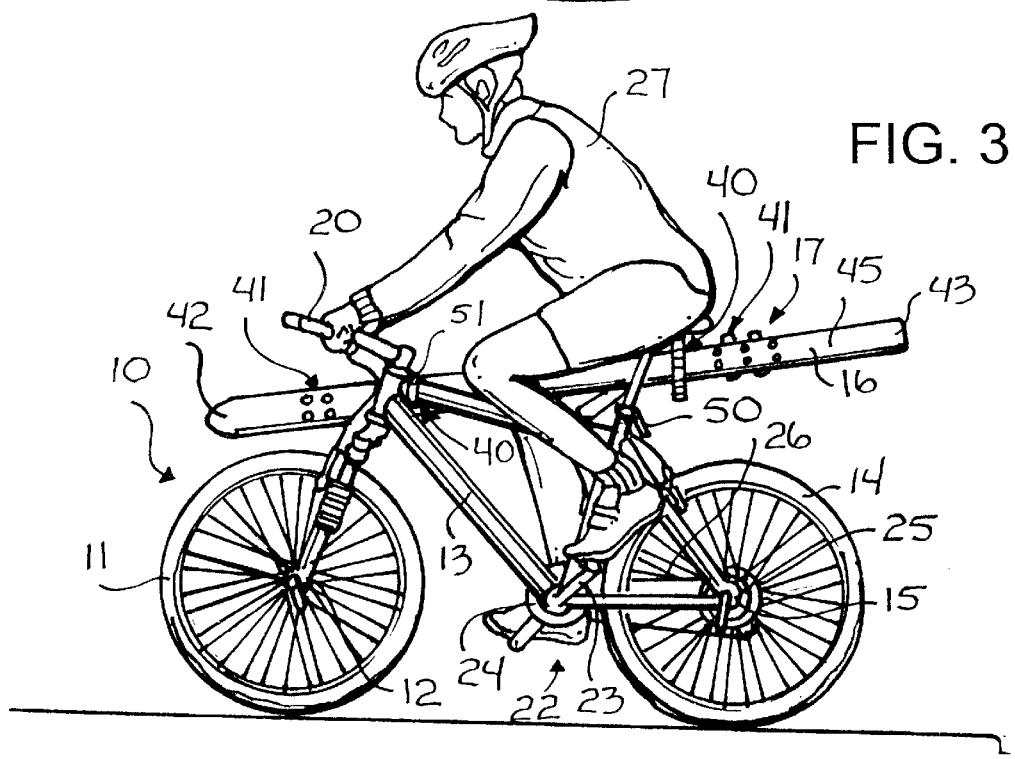
FIG. 3 is a side elevation view of the bicycle of FIG. 1 as it would appear being ridden by a rider.

Referring to FIG. 1, a bicycle 10 including a front wheel 11 attached to front forks 12 at the forward or leading end of a frame 13, a rear wheel 14 attached to rear forks 15 at the rearward or trailing end of frame 13 and a ski 16 of a ski system 17 disposed on frame 13 is shown, in accordance with the invention. Bicycle 10 is illustrative of a typical mountain bike, and it is equipped with ordinary features, namely, a handle bar 20 attached at the forward end of frame 13, a saddle or seat 21 attached at the rearward end of frame 13, a pedaled drive assembly 22 including a crank 23 associated with front gears 24 and which are coupled to rear gears 25 carried by rear wheel 14 with an endless chain 26. These and other convention features of bicycle 10 including, for instance, the hubs and spokes of front and rear wheels 11,14, quick release mechanisms that releasably secure the hubs of front and rear wheels 11,14 to front and rear forks 12,15, respectively, front and rear de-railers and associated switches will readily occur to the skilled artisan and will not be discussed in further detail. In accordance with the invention, bicycle 10 is adjustable between a wheeled condition as shown in FIG. 1 and a skied condition as shown in FIG. 2. FIG. 3 illustrates bicycle 10 being ridden by a rider 27 in its wheeled condition, and FIG. 4 illustrates bicycle 10 being ridden by rider 27 over a snowy surface in the skied condition, with frame 13 and rear wheel 14 positioned atop a face of ski with an opposing working face of ski 16 functioning to providing gliding movement over the snow. In the skied condition, handle bar 20 can be adjusted upwardly for providing improved vertical rider position. However, in the preferred embodiment illustrated in FIG. 4, bar ends are employed and can be easily adjusted upwardly.

Looking to FIGS. 1 and 2, system 17 includes ski 16, an attachment assembly 40 disposed on frame 13 and another attachment assembly 41 disposed on ski 16. Ski 16 is elongate and includes a front or toe end 42, a rear or heel end 43, and opposing faces 44,45 and these are conventional features of a typical ski. End 42 is curved upwardly and face 45 is designed to engage and glide over snow and is considered a working face of ski 16. Attachment assembly 40 is located at the upper end frame 12 and attaches to ski 13 and holds it along side of and substantially parallel to frame 12 as depicted in FIGS. 1 and 3. With front and rear wheels 11,14 attached to front and rear forks 12,15, respectively, rider 27 can sit upon and ride bicycle 10 in a conventional manner with ski 16 held and supported by attachment assembly 40. Attachment assembly 40 holds ski 16 close along side frame 16, and rider 27 when riding bicycle 10 straddles it and ski 16 does not obstruct or impede the ability of rider 27 to pedal and maneuver bicycle 10.

Figure 9:
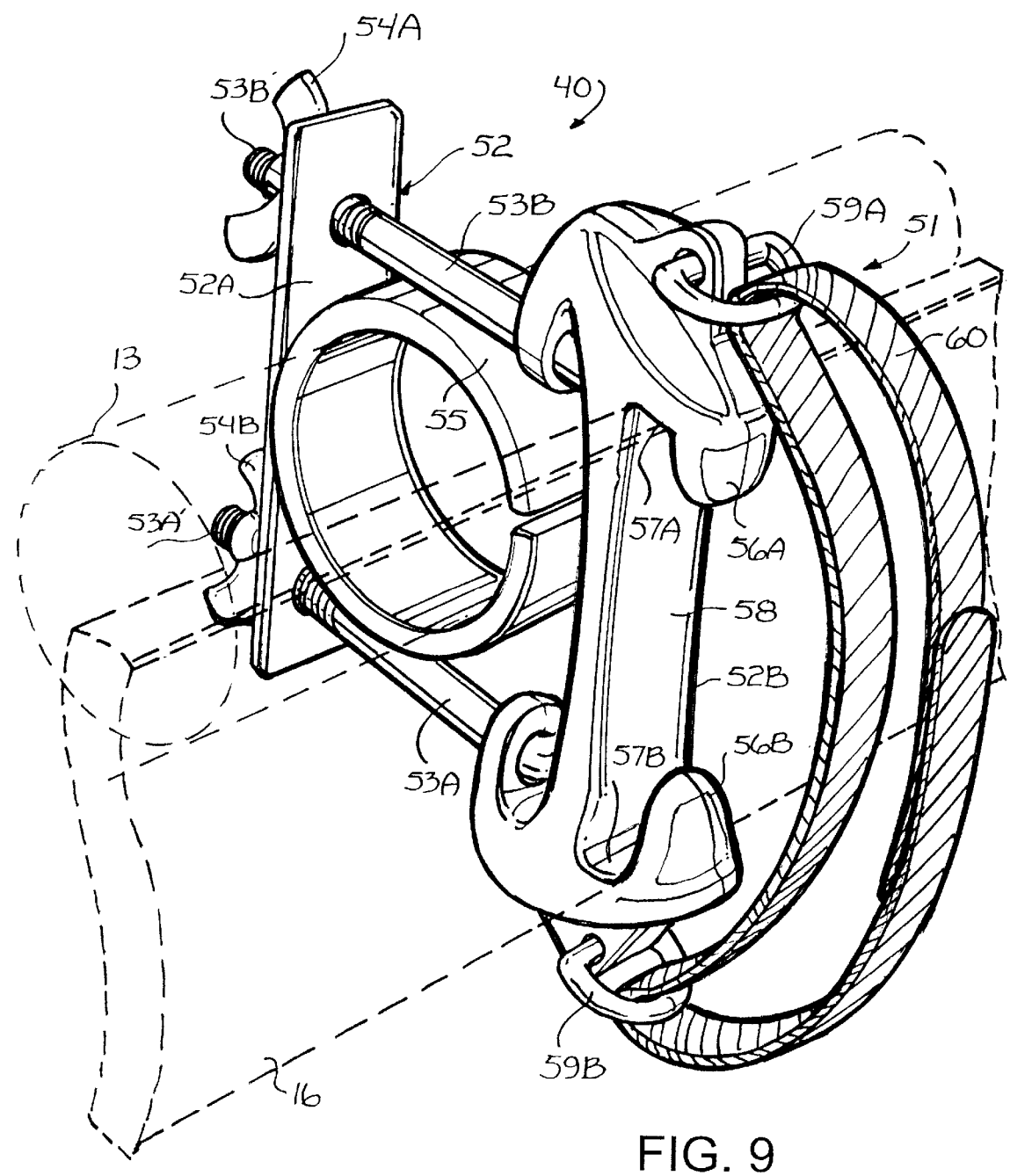
FIG. 9 is a perspective view of a portion of the ski and a front portion of the frame of the bicycle of FIG. 1 including an attachment securing the ski to the frame.

Attachment assembly 40 includes couplings 50,51. Coupling 50 is located proximate the rearward end of frame 12 adjacent seat 21 and coupling 51 is located proximate the forward end of frame 12 adjacent handle bar 20. Looking to FIG. 9, coupling 51 includes a clamp 52, which encircles a portion of frame 13. Clamp 52 is mounted to a portion of the top tube of frame 13 (shown in phantom outline), and encircles it and is seized against it. Clamp 52 includes opposing support members 52A,52B that are connected together at their ends with opposing connectors 53A,53B. Connectors 53A,53B have threaded portions 53A',53B' that extend through openings formed through support member 52A, and wing nuts 54A,54B are threadably attached to portions 53A',53B', respectively, and are tightened against an outer face of support member 52A, which closes support members 52A,52B together and seizes or seizes or otherwise clamps them against frame 13. A protective sleeve 55 is mounted so as to encircle frame 13, and clamp 52 is seized against it, which protects frame 13 from becoming scratched or damaged from the attachment of clamp 52. Sleeve 55 is severed so that it can be easily installed and is constructed of rubber, foam, etc. Support member 52B is considered a gripping element and is elongate, constructed largely of a durable, flexible rubber material, and includes opposing grips 56A,56B that define opposing seats 57A,57B, which are located at either end of an outwardly directed face 58 of support member 52B. Rings 59A,59B are secured at either end of support member 52B, and a closable strap 60 extends into and through rings 59A,59B and is thus carried by rings 59A,59B in opposition to face 58.

In the attachment of ski 16 (shown in phantom outline), ski 16 is passed into and through the space between face 58 and strap 60, and the opposing edges of ski 16 is forced into seats 57A,57B so as to be captured against face 58 by grips 56A,56B and held by grips 56A,56B. Grips 56A,56B can be forced apart for permitting ski 16 to be forcibly positioned within seats 57A,57B and subsequently removed. Strap 60 is openable and closable with hook and loop fastening elements and may be opened, taken up and drawn tightly against ski 16 and closed for facilitating a secure attachment of ski 16 against support member 52B and, more particular, against face 58. As those skilled in the art will readily appreciate, complemental snap, button or a selected form of buckle arrangement may be used in the opening and closing of strap 60. Strap 60 may be opened prior to installing ski 16 into seats 57A,57B if desired, and then drawn and closed so as to overly ski 16 and secure it tightly in place. Reversing this process releases ski 16. A similar arrangement may be used for coupling 50.

Figure 8:
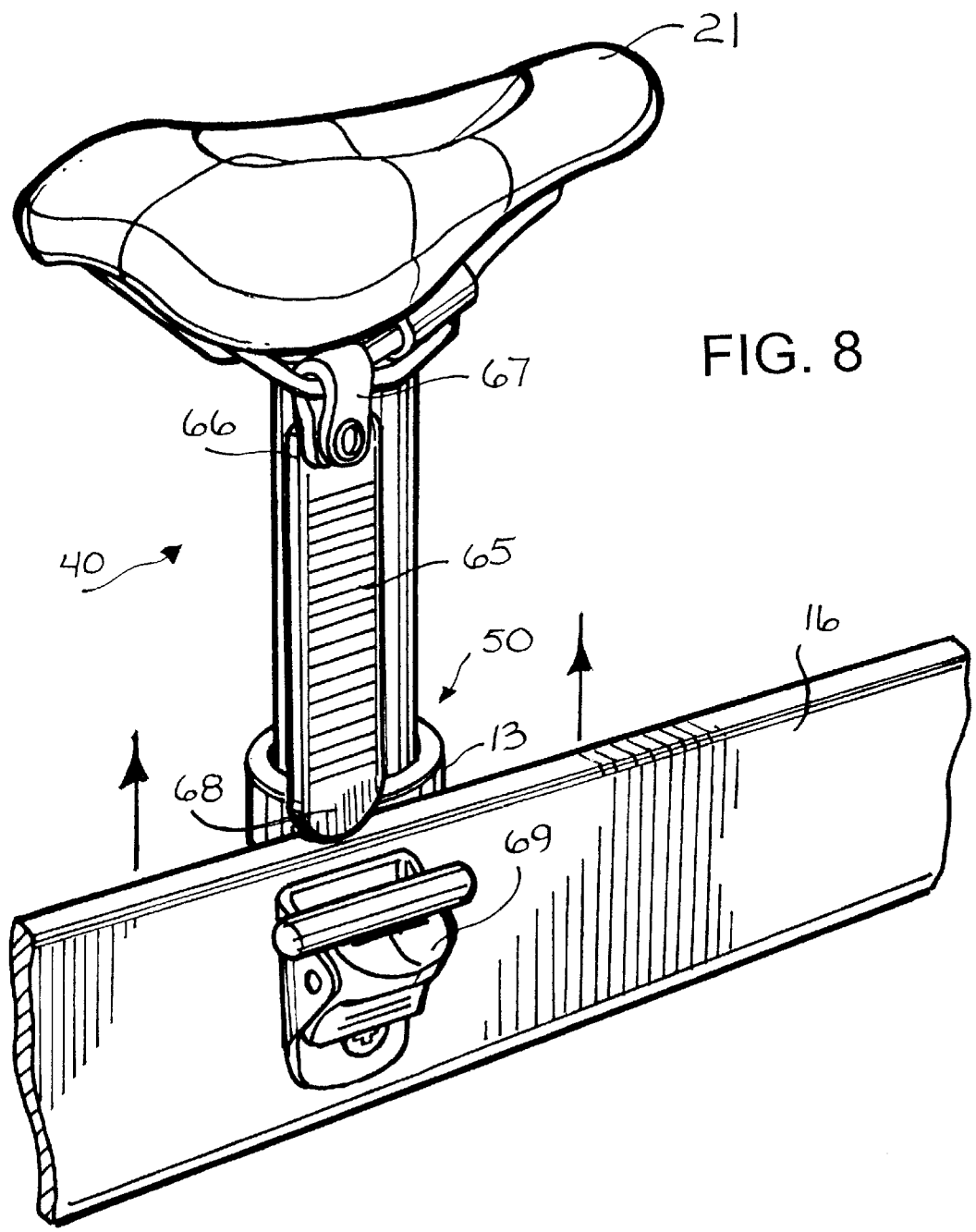
FIG. 8 is a perspective view of a portion of the ski and a rear portion of the frame of the bicycle of FIG. 1 including an attachment securing the ski to the frame.

Looking to FIG. 8, coupling 50 includes a ratchet strap 65 having an end 66 attached to seat 21 by way of an attachment loop 67 and a free end 68, and a ratchet buckle 69 attached to ski 16 with rivets, screws, adhesive, etc. Strap 65 is preferably constructed of a polymer material to provide a degree of rigidity, end 68 of strap 65 is receivable into and through buckle 69, and the ratchet structure of strap 65 and buckle 69 facilitates a secure engagement and this arrangement is readily known as being a very rugged form of buckling attachment. The ratchet structure of buckle 69 is carried by a biased and pivotable lever, which may be moved so as to release strap 65 for releasing ski 16. In the attachment of ski 16, ski 16 is positioned adjacent strap 65 and end 68 is driven into and through buckle 69 for causing a ratcheting engagement between buckle 69 and strap 65. The engagement of strap 65 to buckle 69 is considered a closed condition of strap 65, and strap 65 is therefore considered a closeable strap. Ski 16 is released by releasing buckle 69 from strap 65 and moving strap 65 from buckle 69. Any form of buckle, ratchet buckle or attachment arrangement can be used for releasably engaging strap 65 to ski 16, for attaching strap 65 to frame 13 or seat 21, and strap 65 can be attached to frame 13 at any suitable location in accordance with the invention. A similar arrangement may be used for coupling 51 if desired.

Figure 7:
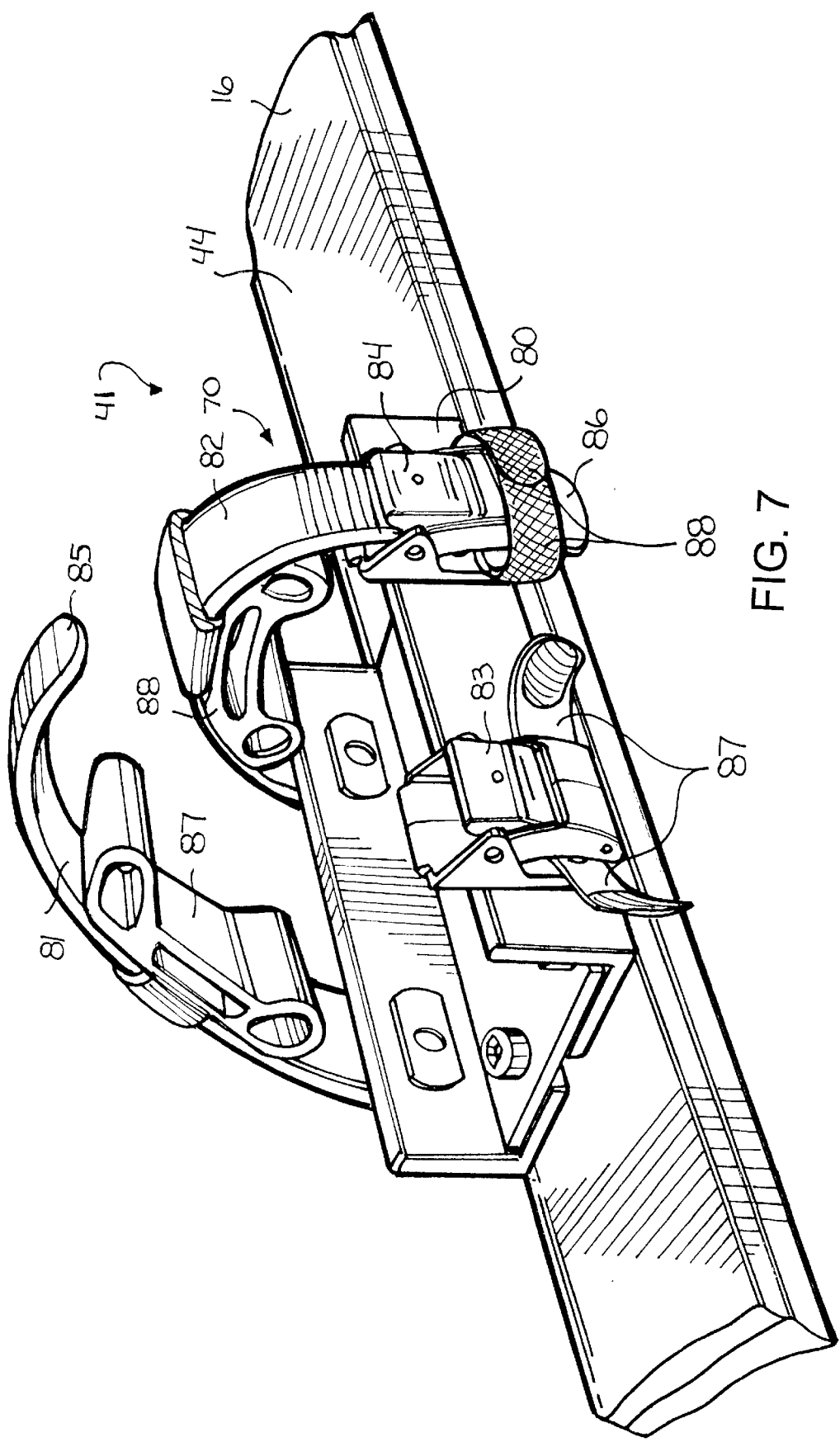
FIG. 7 is a perspective view of a portion of the ski of FIG. 1 including a harness for securing the rear wheel to the ski.

Regarding FIG. 2, attachment assembly 41 includes couplings 70,71. Coupling 70 is located toward heel end 43 of ski 16 and, with front wheel 11 removed, attaches to front forks 12 and coupling 71 is located toward toe end 42 of ski 16 and attaches to rear wheel 14. Looking to FIG. 7, coupling 70 is a harness and it includes a rigid base 80 having attached closable straps 81,82. Straps 81,82 are constructed of rugged nylon or canvass and preferably polymer material and although two straps are shown, less or more may be employed. Base 80 has a substantially U-shape cross-section and is constructed of metal or strong plastic and is secured against face 44 with screws, rivets, adhesive, etc. Straps 81,82 are securely attached to one side of base 80 and buckles 83,84 are securely attached to the other side of base 80. Rivets, screws, adhesive or the like are employed for securing straps 81,82 and buckles 83,84 to base 80, and free ends 85,86 are securely and releasably engagable to buckles 83,84, respectively. Straps 81,82, like buckles 83,84, may be secured to opposing sides of base 80 if desired. Buckles 83,84 are closable ratchet buckles and straps 81,82 are ratchet straps and this arrangement is readily known as being a very rugged form of buckling attachment in connection with many types of known ski boots. In the attachment of ski 16, rear wheel 14 is positioned against base 80 and, more particular, within its U-shaped channel. Straps 81,82 are drawn so as to overly the rim of wheel 14 (not shown in FIG. 7) and then closed with engagement to buckles 83,84, which are each normally pivoted into an open position and then subsequently pivoted into a closed position. Because ratcheting engagement occurs between straps 81,82 and buckles 83,84, straps 81,82 are capable of being drawn very tightly over wheel 14 in the pivotal closing of buckles 83,84 for providing an extremely secure attachment between rear wheel 14 and ski 16. Straps 81,82 are preferably sized so that when closed, ends 85,86 will not extend past ski 16 and engage the snow to inhibit ski gliding. Buckles 83,84 are furnished with closable straps 85,86, respectively, that may be closed around buckles 83,84 for preventing them from accidentally opening. Hook and loop fasteners, complemental snap fasteners and any other form of like fastening structure may be used for facilitating a releasable closing of straps 85,86. Reversing this process releases ski 16. A similar arrangement may be used for coupling 71 for attaching front wheel 11 to ski 16 with front wheel 16 attached to front forks 12 if so desired. Those skilled in the art will readily appreciate that any form of buckle or attachment arrangement can be used for releasably closing straps 81,82. In the embodiment depicted in FIG. 7, straps 81,82 are each furnished with attached seats 87,88, which are designed to overly and engage against the rim of wheel 14 for providing an additional measure of gripping against wheel 14 when straps 81,82 are closed and securing wheel 14.

Figure 5:
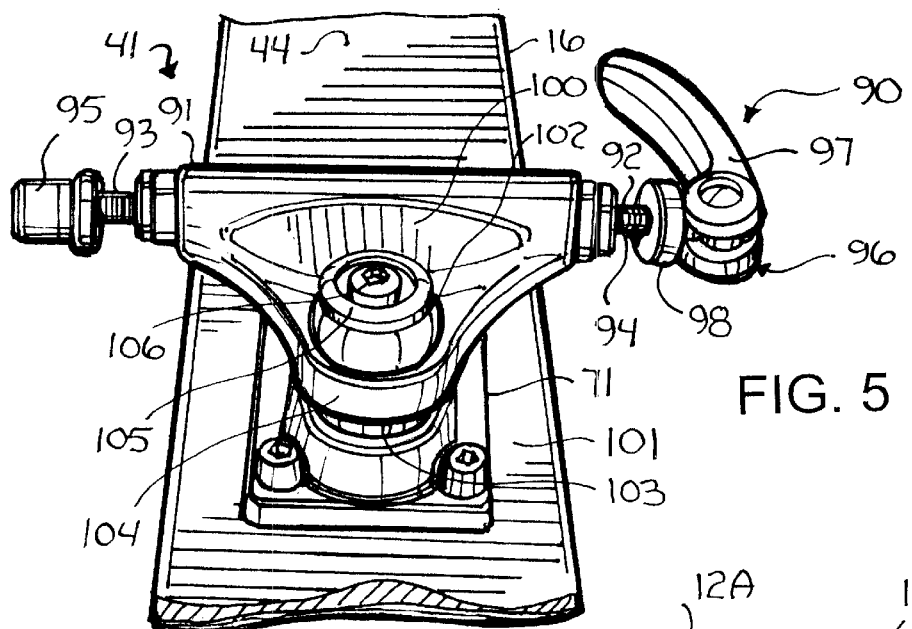
FIG. 5 illustrates a portion of the ski of FIG. 1 including an attachment hub.
Figure 6:
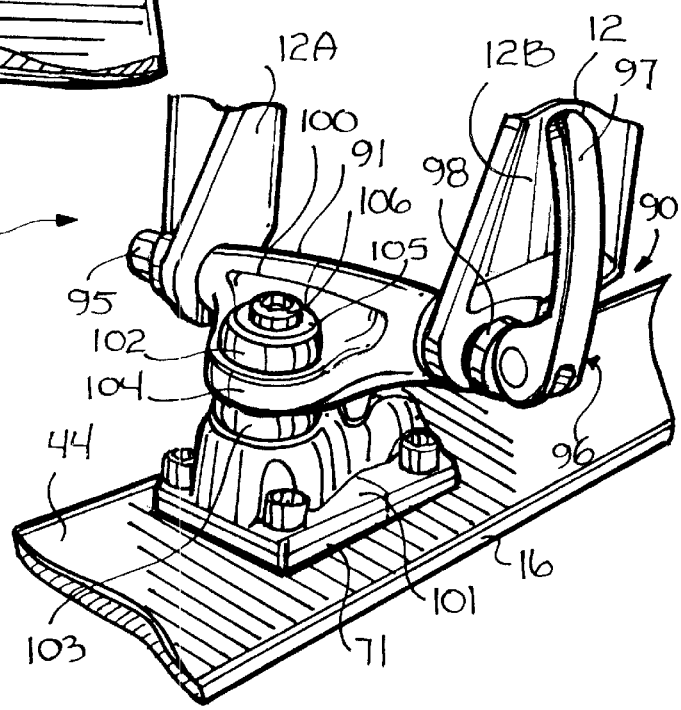
FIG. 6 is a perspective view of a portion of the ski of FIG. 1 with the attachment hub of FIG. 5 attached to the front forks of the frame of the bicycle.

Looking now and in relevant part to FIGS. 5 and 6, coupling 71 is an attachment hub and includes a quick release assembly 90 supported by a supporting structure 91. Assembly 90 includes an axle 92, which extends through a hollow portion of structure 91. Axle 92 has opposing threaded ends 93,94, which extend outboard of opposing ends of support 91 on either side thereof. A cap 95 is threadably attached to end 93 and levered cam assembly 96 is attached to end 94 and this can be reversed. Cam assembly 96 includes a cam lever 97, which is mounted for pivotal movement, and an associated stop 98, which freely encircles axle 92. Structure 91 includes opposing portions 100,101. Portion 101 is essentially a base and is secured against surface 44 of ski 16 with screws, and rivets, adhesive and/or other forms of engagement structure may be employed for providing a secure and strong attachment. Resilient, rubber/elastomeric spacers 102,103 are located on either side of a nose 104 of portion 100. A washer 105 is positioned atop spacer 102, and a headed bolt 106 extends through washer 105, spacer 102, nose 104 and spacer 103, and is threadably secured to portion 101 and this provides a resilient, flexible and secure attachment between portions 100,101. Structure 91 can be entirely rigid if desired, or otherwise constructed without any flexible or resilient attachment assembly, and structure 91 can be provided in any form that is suitable for holding axle 92 proximate ends 93,94. The resiliency of the attachment hub is desirable, as it functions to absorb shocks.

In the attachment of ski 16, front wheel 11 is removed from front forks 12. The ends of forks 12 are C-shaped and this is a conventional feature with the forks of most if not all bicycles, including road bikes and mountain bikes. The end of fork 12A is seated atop axle 92 proximate end 93 between cap 95 and support 91, and the end of the other fork 12B is seated atop axle 92 proximate end 94 between stop 98 and support 91. By pivoting lever 97, a cam action is exerted against stop 98 forcing it against fork 12B and fork 12B against structure 91. As this caming force is forcibly applied by acting on lever 97, axle 92 is driven axially through structure 91, which moves cap 95 against fork 12A and fork 12A against structure 91. This cam action facilitates a secure and rugged clamping of the ends of forks 12A,12B between structure 91 and cap 95 and between structure 91 and stop 98. The relative tightness of the grip or clamp against the ends of forks 12A,12B can be varied by threadably loosening and tightening cap 95. Reversing this process releases ski 16. A similar arrangement may be used for coupling 70 for attaching rear forks 15 to ski 16 with rear wheel 15 removed.

In accordance with this disclosure, bicycle 10 is adjustable between a wheeled condition (FIGS. 1,3) and a skied condition (FIGS. 2,4). In the wheeled condition, front and rear wheels 11,14 are attached to front and rear forks 12,15, respectively, and ski 16 is attached to frame 12 with attachment assembly 40 as explained previously. In the skied condition, front wheel 11 is removed from front forks 12, and front forks 12 and rear wheel 15 are attached to ski 16 with attachment assembly 41 as explained previously. In the wheeled condition, bicycle 10 can be ridden in a conventional manner. In the skied condition, bicycle 10 can be ridden to ski over a snowy surface, with ski 16 providing a gliding traverse over the snow. To store front wheel 11 in the skied condition of bicycle 10 as shown in FIGS. 2 and 4, closable straps or other similar attachments 107,108 are used for releasably securing the hub of front wheel 11 to the rim of rear wheel 14 and the rim of front wheel 11 to portions of the rearward end of frame 13.

The invention has been described above with reference to one or more preferred embodiments. However, those skilled in the art will recognize that changes and modifications, whether known in the art or novel, may be made to the described embodiments without departing from the nature and scope of the claimed invention, and that operations and engagement pairs may be reversed and that any form of attachment mechanism or clamping assembly may be used for securing ski 16 to bicycle 10 in its wheeled condition and for securing ski 16 to bicycle in its skied condition. Accordingly, any such changes and modifications to one or more of the embodiments herein chosen for purposes of illustration are intended to be included within the scope of the invention as assessed only by a fair and reasonable interpretation of the ensuing claims.

Having fully described the invention in such clear and concise terms as to enable those skilled in the art to understand and practice the same, the invention claimed is:

1. Apparatus comprising:

a bicycle frame including front forks and an attached rear wheel;

a ski; and an attachment assembly securing the front forks and the rear wheel to the ski, the attachment assembly includes an attachment hub securing the front forks to the ski and a harness securing the rear wheel to the ski, the attachment hub includes a quick release assembly carried by a support having a first portion supporting the quick release assembly and a resiliently attached second portion attached to the ski.

2. Apparatus of claim 1, wherein the harness comprises closable straps attached to a base secured to the ski.

3. Apparatus of claim 1, further including a front wheel removable engagable to the front forks and attachments attaching the front wheel to the rear wheel and to portions of the frame.

4. Apparatus comprising:
  a bicycle frame including front forks and an attached rear wheel;
  a front wheel;
  a ski; and
  an attachment assembly disposed on the ski, the attachment assembly includes an attachment hub having a quick release assembly carried by a support having a first portion supporting the quick release assembly and a resiliently attached second portion attached to the ski, and a harness;
  wherein the frame is adjustable between a wheeled condition comprising the front wheel attached to the front forks and a skied condition comprising the attachment assembly attached to the front forks and the rear wheel.

5. A apparatus of claim 4, wherein the harness comprises closable straps attached to a base secured to the ski.

6. Apparatus of claim 4, further including attachments for releasably securing the front wheel to the rear wheel and to portions of the frame in the skied condition of the frame.

7. Apparatus comprising:
  a bicycle frame including front forks and an attached rear wheel;
  a front wheel;
  a ski;
  a first attachment assembly disposed on the ski; and
  a second attachment assembly disposed on the frame;
  wherein the frame is adjustable between a wheeled condition comprising the front wheel attached to the front forks and the ski attached to the second attachment assembly and a skied condition comprising the first attachment assembly attached to the front forks and the rear wheel.

8. Apparatus of claim 7, wherein the first attachment assembly includes an attachment hub and a harness.

9. Apparatus of claim 8, wherein the attachment hub comprises a quick release assembly carried by a support attached to the ski.

10. Apparatus of claim 9, wherein the support comprises a first portion supporting the quick release assembly and a resiliently attached second portion attached to the ski.

11. Apparatus of claim 8, wherein the harness comprises closable straps attached to a base secured to the ski.

12. Apparatus of claim 8, wherein the second attachment assembly comprises a strapped gripping element and a closable strap.

13. Apparatus of claim 12, wherein the strapped gripping element comprises:
  an attached gripping element having opposing grips that define seats for accommodating the ski; and
  a closable strap attached to the gripping element.

14. Apparatus of claim 7, further including attachments for releasably securing the front wheel to the rear wheel and to portions of the frame in the skied condition of the frame.

* * * * *